No. 810,197. PATENTED JAN. 16, 1906.
E. EINFELDT.
MACHINE FOR MAKING METAL WHEELS.
APPLICATION FILED OCT. 20, 1904.

Witnesses
Sidney P. Hollingsworth
A. M. E. Kennedy

Inventor
Emil Einfeldt
by P. P. Dodge
Attorney

No. 810,197. PATENTED JAN. 16, 1906.
E. EINFELDT.
MACHINE FOR MAKING METAL WHEELS.
APPLICATION FILED OCT. 20, 1904.

Witnesses
Sidney P. Hollingsworth
A. M. C. Kennedy

Inventor
Emil Einfeldt
P. T. Dodge
Attorney

No. 810,197. PATENTED JAN. 16, 1906.
E. EINFELDT.
MACHINE FOR MAKING METAL WHEELS.
APPLICATION FILED OCT. 20, 1904.

No. 810,197. PATENTED JAN. 16, 1906.
E. EINFELDT.
MACHINE FOR MAKING METAL WHEELS.
APPLICATION FILED OCT. 20, 1904.

Fig. 9
ON LINE 9-9

Witnesses
Sidney P. Hollingsworth
A. M. E. Kennedy

Inventor
Emil Einfeldt
By P. T. Dodge
Attorney

No. 810,197. PATENTED JAN. 16, 1906.
E. EINFELDT.
MACHINE FOR MAKING METAL WHEELS.
APPLICATION FILED OCT. 20, 1904.

Witnesses
Sidney P. Hollingsworth
a. M. E. Kennedy

Inventor
Emil Einfeldt
By P. T. Dodge
Attorney

UNITED STATES PATENT OFFICE.

EMIL EINFELDT, OF DAVENPORT, IOWA, ASSIGNOR TO BETTENDORF METAL WHEEL COMPANY, A CORPORATION OF IOWA.

MACHINE FOR MAKING METAL WHEELS.

No. 810,197. Specification of Letters Patent. Patented Jan. 16, 1906.

Application filed October 20, 1904. Serial No. 229,222.

*To all whom it may concern:*

Be it known that I, EMIL EINFELDT, of Davenport, county of Scott, and State of Iowa, have invented a new and useful Improvement in Machines for Making Metal Wheels, of which the following is a specification.

This invention relates to machines for use in the manufacture of metal wheels, and is designed more particularly for fastening the spokes to the hub and rim. In certain machines for this purpose the shoulders on the spoke at the inner side of the rim or outer side of the hub are formed by upsetting the spoke endwise at these points, which action results in the shortening of the spoke, and by reason of the fact that the spokes frequently vary in diameter and structure the shortening is unequal, so that the circular form of the rim is destroyed, or if the spokes are incidentally placed under tension, as by cooling after they are fastened in hot, the tension is unequal.

The aim of the present invention is to overcome these objections; and the invention consists in mechanism of improved form and construction acting to secure the spoke to the hub and rim without varying the length of the spoke between these members.

The machine embodying the present invention is designed with special reference to the manufacture of "staggered" wheels wherein the spokes are fastened to the hub in two rows or ranks and are secured to the rim either in a single line or in two lines approaching each other more or less. In the operation of the machine for the production of wheels of this type the spokes of one rank after their ends have been previously heated are first secured in place in succession, and after they have cooled, and consequently contracted and have been thus placed under tension, the spokes of the other rank are secured in place, the result being that a wheel is produced in which all the spokes are under a uniform tension.

The machine is adapted to operate on a closed rim and spokes which have had previously formed on them each a shoulder adapted to bear against the outer side of the hub, and the mechanism acts to form heads on the opposite ends of the spoke at the inside of the hub and outside of the rim, respectively, and a shoulder at the inner face of the rim, which shoulder is formed by scraping up the outer skin or exterior portion of the spoke at this point and accumulating it against the rim, so that in the fastening operation there will be no shortening of the spoke between the hub and the rim.

While the machine illustrated and described is, as shown, adapted for manufacturing staggered wheels, it may by slight adjustment of the parts be adapted for producing a "straight" wheel—that is, a wheel in which the inner ends of the spokes are secured in a single line to the hub and the outer ends in a like manner to the rim.

In the accompanying drawings, Figure 1 is a side elevation of my improved machine. Fig. 1ª is a plan view of the rim which is employed in making a wheel in my improved machine. Fig. 1ᵇ is an elevation of the spoke used, showing the relation of the hub, rim, and spoke-clamps. Fig. 3 is a vertical transverse sectional elevation on the line *m m* of Figs. 1 and 2 as viewed in the direction of the arrows cutting said line. Fig. 3ª is a horizontal section on the line *v v* of Fig. 3, showing the form of the grasping-surfaces by which the shoulder at the inner face of the rim is formed. Fig. 4 is a vertical transverse section on the line *k k* of Figs. 1 and 2 as viewed in the direction of the arrows cutting said line. Fig. 5 is a similar view on the line *s s* of Figs. 1 and 2 looking in the direction of the arrows on said line. Fig. 8 is a similar view showing the rim-rest, the header for the outer end of the spoke, and its operating mechanism. Fig. 8ª is a horizontal transverse section on the line *t t* of Fig. 1. Fig. 10ª is a vertical transverse section on the line *x x* of the preceding figure. Fig. 11 is a transverse vertical sectional elevation on the line *o o* of Fig. 10.

In the drawings, 1 represents a base-plate from which there rises at opposite ends standards 2 and 3, giving support to two horizontal longitudinally-extending parallel frame-bars 4, firmly secured at their ends to the standards, which parts constitute a rigid frame on which the various operative mechanisms are supported.

Figures 1, 1A, 1B:
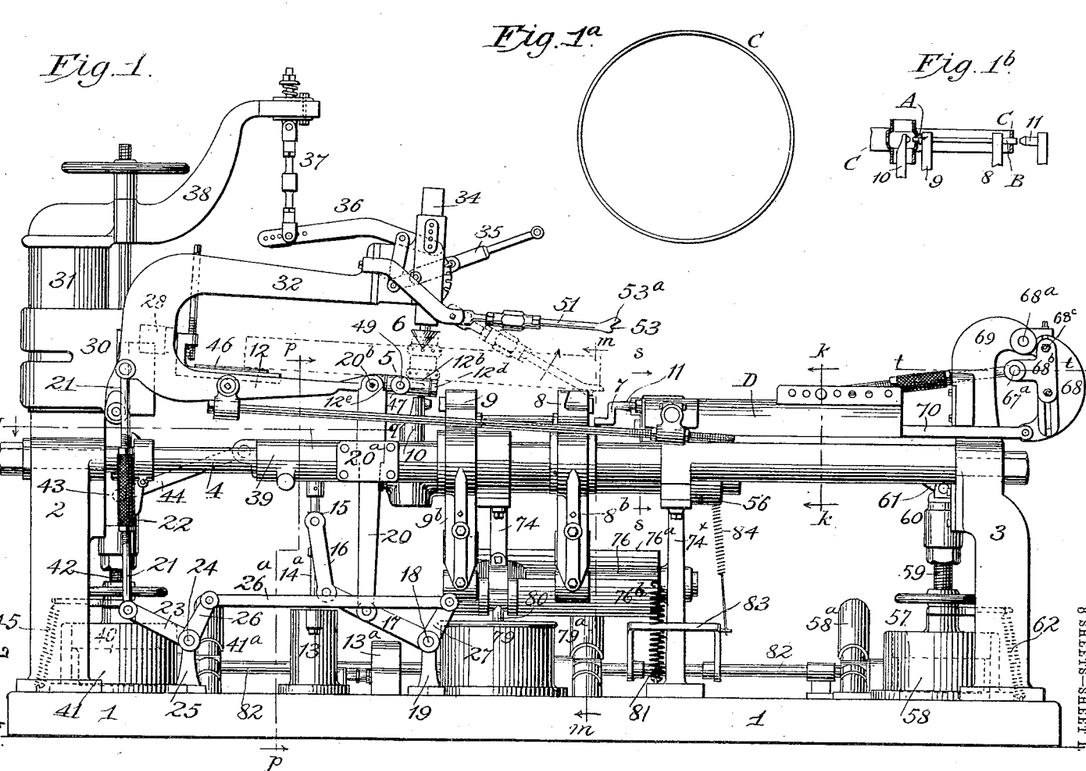

The main operating parts of the machine comprise a hub-support 5, by which the hub is sustained on end and clamped by a clamping-head 6; a rim-support 7, by which the rim is sustained at the point where the spoke-fastening means act; a spoke-clamp 8, adapted to grasp the spoke near the inner face of the rim; a second spoke-clamp 9, adapted to grasp the spoke adjacent the outer side of the hub; a heading device 10, adapted to act on the end of the spoke within the hub and form a head thereon, and a second heading device 11, adapted to act on the outer end of the spoke and form a head thereon, this heading device 11, the rim-support, and the spoke-clamp 8 being so formed and operated, as will be more fully described hereinafter, that when the heading device 11 advances the rim and spoke will be pushed endwise relative to the clamp, resulting in the formation of a "scraped-up" shoulder on the spoke at the inner face of the rim. For sake of clearness I have in the specification designated the heading device 10, which acts on the end of the spoke within the hub, the "hub-header," and I have designated the heading device 11, which acts on the spoke outside the rim, the "rim-header." These several mechanisms referred to are adapted to operate on a spoke which has had previously formed on it near its inner end a shoulder A, Fig. 1$^b$, which abuts against the outer face of the hub, and which spoke has its outer end thickened, as at B, and a rim C, with its ends closed, as shown in Fig. 1$^a$, and when these parts are to be fastened together the clamps 9 grasp the spoke near the hub and abut against the outer side of the shoulder A, which shoulder rests against the outer side of the hub, while the clamps 8 grasp the spoke at the thickened portion B a slight distance from the inner face of the rim, the pressure of the clamps being such that while holding the spoke firmly as far as any lateral motion is concerned they will permit an endwise movement of the same in order to effect the scraping up of the thickened portion B to form the shoulder as the inner face of the rim. In the operation of these mechanisms the hub-header first advances and upsets the end of the spoke within the hub and immediately retreats, the spoke and hub during these operations being firmly held against endwise motion in the direction in which the hub-header acts by means of the clamps 9, against which the shoulder A abuts. The rim-header 11 now advances in the opposite direction and upsets the outer end of the spoke to form a head, simultaneously with which action the rim, hub, and spoke are pushed endwise at less speed than the rim-header and with relation to the clamps, with the result that the thickened portion of the spoke is scraped up by the frictional resistance offered by the clamps 8, and this scraped-up portion is accumulated in the form of a shoulder and disposed in forcible contact with the inner face of the rim.

Figure 2:
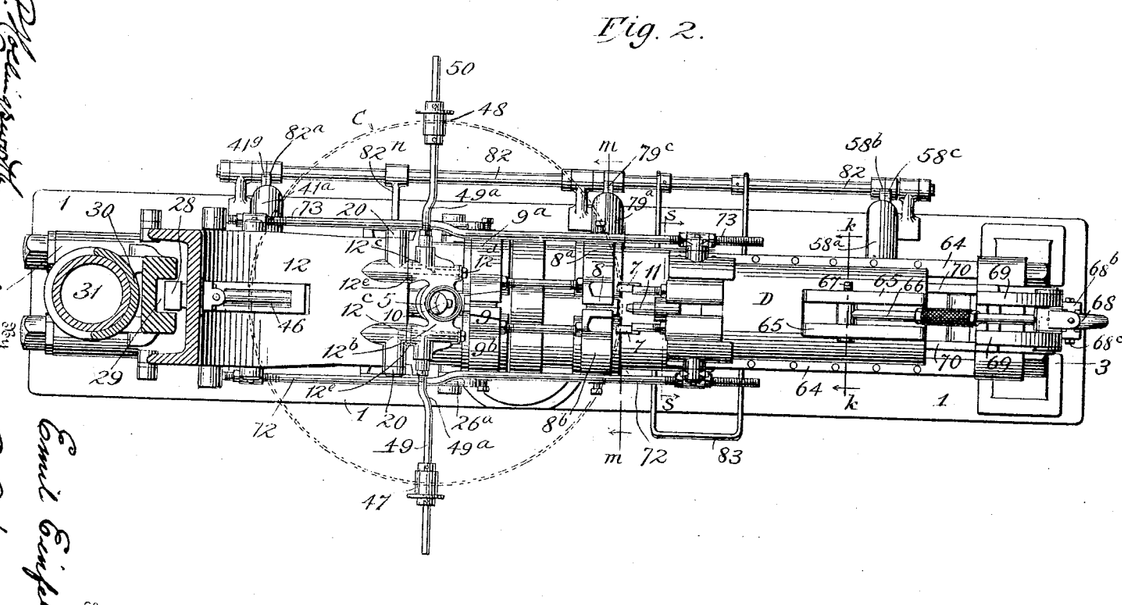
Fig. 2 is a top plan view of the machine with certain parts in section and other parts removed.
Figure 7:
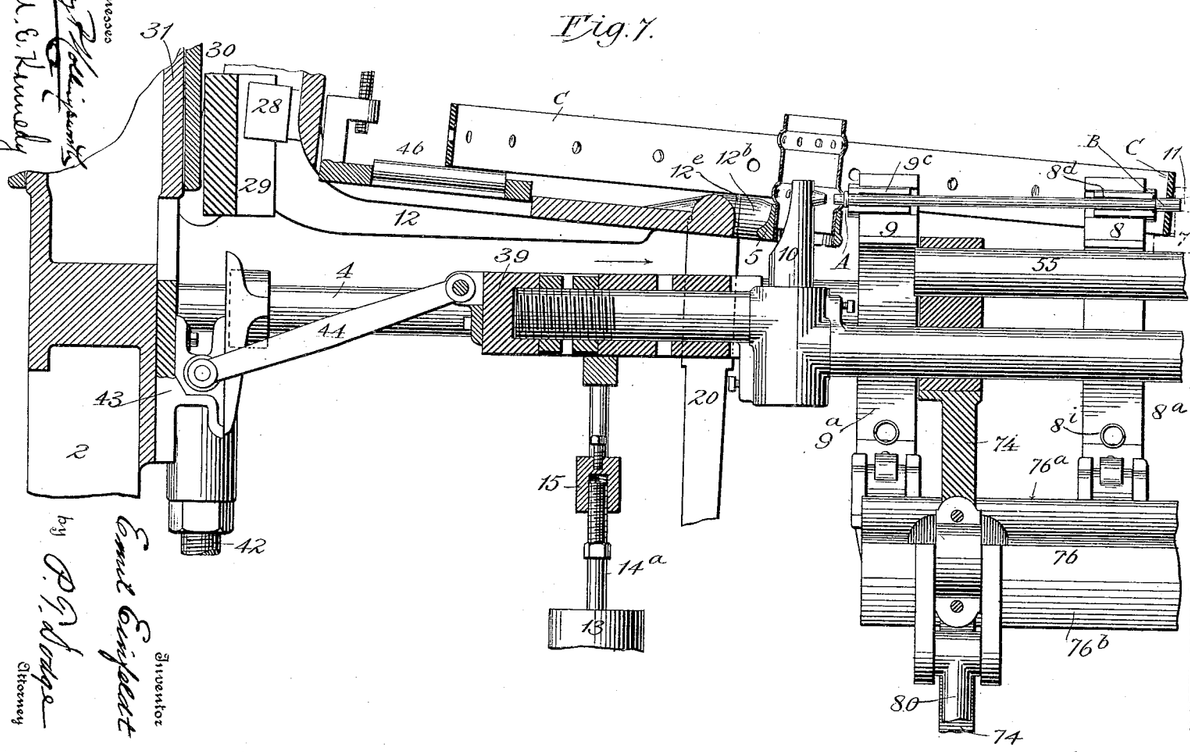
Fig. 7 is a vertical longitudinal sectional view through a portion of the machine, on an enlarged scale, showing the spoke-clamps, hub-support, the header for the inner end of the spoke, and its operating mechanism.

The hub-support 5 comprises a horizontal flat frame 12, Figs. 1, 2, and 7, which is movable vertically in order to lower the parts of the wheel into active relation to the operative mechanism, and which frame is also movable horizontally to permit the hub and the spoke, which has been secured to it by the hub-header to be shifted with relation to the clamps in the action of scraping up the shoulder at the rim end of the spoke. The vertical movement of this frame is effected through the instrumentality of a cylinder 13, having a piston 14 adapted to be operated by fluid under pressure in the manner described later on. The piston is provided with a piston-rod 14$^a$, carrying a cross-head 15, to the opposite ends of which are jointed the upper ends of two links 16, whose lower ends are jointed to arms 17, fixed to a horizontal transverse rock-shaft 18, mounted in bearings in the upper ends of posts 19, rising from the base-plate. The arms 17 have jointed to them and between their ends the lower ends of two vertical rods 20, which extend upwardly through guideways 20$^a$ on the frame and at the outer opposite sides of the frame 12, to which they are jointed, as at 20$^b$, at a point near its inner end, where the hub is sustained. By means of these connections when the piston 14 rises the arms 17 will be elevated, and through the medium of the connecting-rods 20 the inner end of the hub-frame 12 will be raised, and when the piston moves downwardly a reverse movement of the parts takes place, and the hub-frame will be lowered. In order that the opposite end of the hub-frame may partake of like movements and simultaneously with those just described, the outer end of this frame has jointed to it the upper ends of two vertical bars 21, each having a turnbuckle 22 to permit longitudinal adjustment. The lower ends of these bars are pivoted to the outer ends of arms 23, mounted at their inner ends on a transverse rock-shaft 24, sustained in bearings in the upper ends of standards 25, extending from the base-plate. This rock-shaft has connected with it two arms 26, arranged at right angles to arms 23, to the ends of which are connected two horizontal links 26$^a$, extending longitudinally and jointed at their opposite ends to arms 27 on the rock-shaft 18. As a result of these connections the movement of the arms 17 by the piston will rock shaft 18, which action will vibrate arms 27, and this will through the medium of the horizontal links 26ª rock the shaft 24, which action will in turn vibrate arms 23 and raise or lower the vertical links 21, thereby raising or lowering the outer end of the hub-supporting frame 12. Owing to the character and arrangement of these connections, the frame 12 will be moved bodily up and down and at all times during such movements will preserve a horizontal position.

The hub-supporting frame 12 is guided at its outer end and prevented from shifting laterally by means of a lug or block 28, fixed thereto and mounted to slide vertically in a vertical guideway 29, formed in the face of a collar or sleeve 30, fixed to and surrounding a vertical column 31, rising from the end standard 2 of the main frame. This guideway is opened at its front, so that the guiding-lug may move freely therein when the frame 12 is shifted horizontally during the operation of scraping up the shoulder near the outer end of the spoke.

The frame 12 is provided at its inner end with a vertical socket to receive the hub on end and allow it to be shifted around therein so as to bring the next hole in position for fastening the next spoke. This socket is formed in an extension 12ᵇ of the frame proper, which extension is provided with openings or holes extending longitudinally therethrough and adapted to receive longitudinal bolts 12ᶜ, projecting from the end of the frame proper, as shown in dotted lines in Fig. 2, the extension being confined on these plates by nuts 12ᵈ. The purpose of this separable extension is to admit of the longitudinal adjustment of the hub-holder socket with reference to the frame 12 and other parts of the machine to meet the varying conditions encountered in practice as regards the size of the wheel and spokes, &c. The adjustment of this extension is effected by inserting between the adjacent ends of the same and the frame 12 washers 12ᵉ of different thickness.

The hub held in frame 12 is adapted to be clamped and held firmly by the clamping-head 6, before alluded to, which is mounted in and sustained by the overhanging end of an arm 32, extending upward from the outer end of the frame 12 and forming a continuation thereof. This clamping-head is conical in form and mounted on the lower end of a vertical slide 34, guided in the end of arm 32 and raised and lowered manually by a hand-lever 35 to enter it in the upper end of the hub, which head is operated automatically to firmly clamp the hub when the frame descends to bring the parts of the wheel into active relation to the operating mechanism. This automatic clamping operation is effected by links 36 and 37, connecting the slide with a fixed arm 38, extending upwardly and forwardly from the upper end of the column 31. The clamping mechanism is identical in operation and construction to that described in Letters Patent of the United States, No. 640,548, issued to me January 2, 1900, to which reference may be had for a more detailed description than is here given. When the hub-holding frame is lowered by the mechanism described, the end of the spoke projecting therein is brought opposite the hub-header 10, so that when the hub-header is advanced it will upset the spoke within the hub. This header is in the form of a tool or die projecting upward from a horizontal slide and is advanced to perform the heading operation by means of a piston 40, Fig. 1, in a cylinder 41, resting on the bed-plate and adapted to be operated by fluid under pressure, which piston is provided with a rod 42, carrying a head 43, sliding in a vertical guideway in the inner face of standard 2 and connected by a link 44 with the slide 39, the arrangement being such that when the piston rises it will act, through the link, to push the slide in the direction of the arrow, Fig. 7, and advance the header to its work, and when the piston descends the slide will be positively retracted in the opposite direction and the header withdrawn. The rise of the piston is effected by admission of air under pressure below the piston, while its descent is effected by a spring 45, Fig. 1, connected with the piston and with the frame of the machine and acting when the cylinder is opened to the exhaust to positively draw the piston downwardly. The control of fluid under pressure to and its exhaust from the cylinder is effected by valve mechanism described later on.

The support 7 for the rim at the point where the rim-header acts to head the outer end of the spoke comprises two fingers 7ª, as shown particularly in Figs. 1, 2, 5, and 8, which fingers are sustained adjacent to and on opposite sides of the rim-header on a sliding cap D. These fingers are each formed with a vertical shoulder or rest 7ᵇ, adapted to bear against the outer face of the rim, and a horizontal forwardly-extending supporting-surface 7ᶜ, on which the lower edge of the rim rests when the hub-holding frame is lowered to bring the parts of the wheel in position to be acted on. At its diametrically opposite side the rim is adapted to rest on a horizontal longitudinal supporting-roller 46, mounted on the hub-frame 12, while at intermediate points in its circumference the rim is adapted to rest on horizontal supporting-rollers 47 and 48, mounted adjustably on arms 49 and 50, extending laterally outward from the opposite sides of the extension 12ª of the hub-frame, which several supporting-rollers when the hub-frame is lifted, as shown in Fig. 1, permit the rim to be readily turned around to bring the next hole in position for the insertion of another spoke. The lateral arms 49 and 50 are formed, near their points of attachment with the extension, with an offset or cranked portion 49ª, and they are so secured to the extension that they may be adjusted around their longitudinal axes, which adjustment will result in the raising or lowering of rollers.

When the parts are lowered, as shown in Fig. 7, and the rim rests on the fingers 7ª, it is firmly held in this position by means of a clamping-arm 51, pivoted at its upper end to the overhanging arm 32, whence it extends obliquely downward to the upper edge of the rim, at which point it is recessed to form a vertical shoulder or abutment 53, engaging the inner face of the rim, and a horizontal finger 53ª, resting on the upper edge of the rim. The pivotal connection of the arm will allow it to be swung upward to disengage and release the rim when the latter is to be shifted around in position.

With the parts in the position described, with the rim supported by fingers 7ª, the spoke will extend within clamps 8 and 9, with its outer end opposite the rim-header 11 ready to be acted upon by the advance of this header. The rim-header consists of a horizontal header tool or die carried on the end of a horizontal slide-bar 55, mounted to slide back and forth in a fixed guide-frame 56, fixed to the two frame-bars 4. It is actuated by means of a piston 57 in a cylinder 58 on the base-plate of the machine, which piston is provided with a vertical piston-rod 59, carrying at its upper end a vertically-movable head 60, sliding in vertical guideways in the standard 3. The head is connected with the sliding bar by means of a link 61, the construction being such that when the piston rises on the admission of fluid under pressure beneath it the sliding bar will be advanced on its guiding-frame and will advance the heading-tool to its work, the retraction of the heading-tool being positively effected by spring 62, fixed to the piston and to the base-plate of the machine, which spring when the cylinder is opened to the exhaust, as will be more fully described later, will pull the piston downwardly.

As before stated, when the rim-header advances to its work and simultaneous with its upsetting action on the spoke end the spoke is moved endwise in the clamps, together with the rim and hub, this endwise movement of the spoke with reference to the clamp (which grasps it near the rim) resulting in the scraping or piling up of the outer skin or thickened portion of the spoke to form the shoulder at this point. If in these actions the spoke is moved endwise at the same speed of the rim-header, the latter will have no effect on the spoke end. Hence it is necessary that the rim-header move faster than the spoke, so as to overtake it, as it were, and upset the end of the spoke while the latter is moving through the clamps. It has been found that the relative movement of two should be such that the rim-header will move twice as fast as the rim and the spoke, and the mechanism for accomplishing this action, now to be described, is formed to give this result.

Figures 8, 8A:
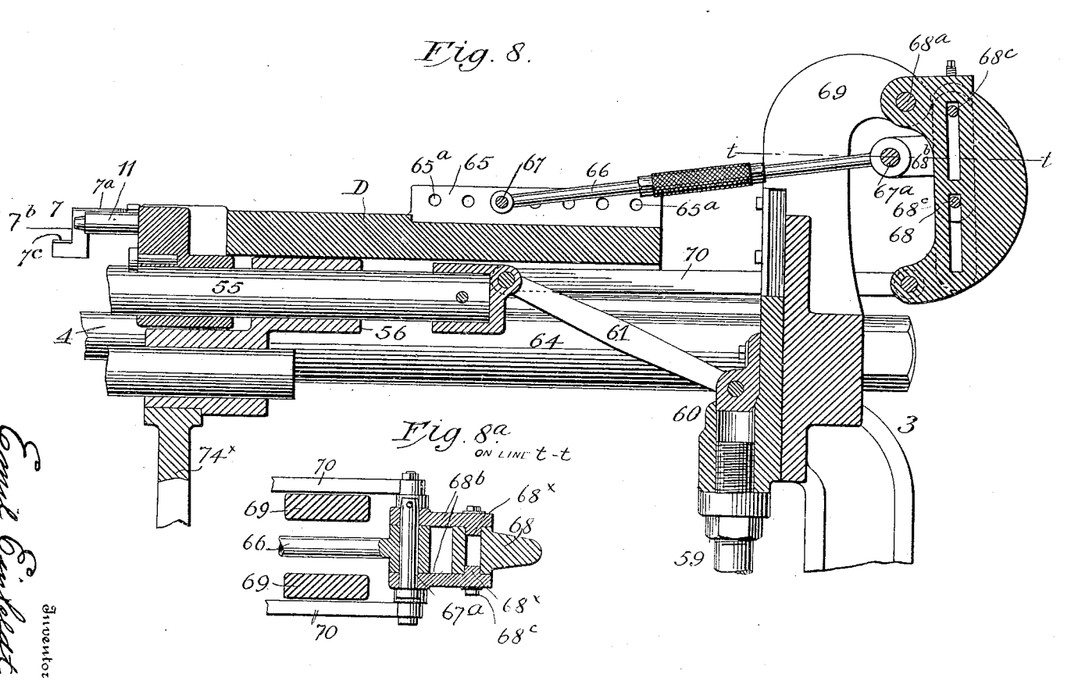
Figure 9:
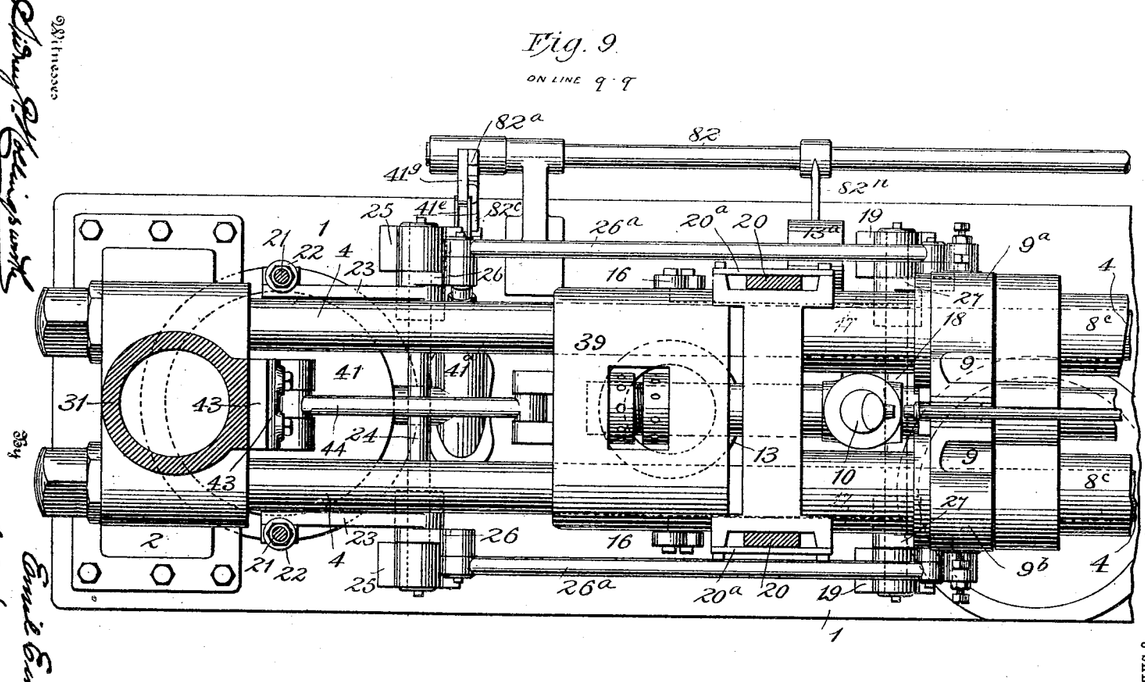
Fig. 9 is a horizontal sectional plan view, on an enlarged scale, on the line *q q* of Fig. 1.

As shown in Fig. 8, the rim-supporting fingers 7ª are, as before stated, carried on the end of the horizontal sliding cap-plate D, which is mounted in guideways in the upper edges of a horizontal frame 64, fixed to and sustained by the two parallel frame-bars. This cap-plate has formed on its top two vertical ribs 65, containing each a number of holes 65ª for the purpose of forming an adjustable connection therewith of a link 66, which link has a hole in its end to receive a pivot-pin 67, which may enter either of the holes in the cap-plate. The opposite end of the link is jointed, as at 67ª, to a vertical pendent lever 68 at a point between the ends of said lever, the latter being pivoted at its upper end, as at 68ª, between the upper ends of two extensions 69, rising from the standard 3. The lower end of the pendent lever is connected, by means of two horizontal links 70, with lateral studs 75, projecting outward from the sides of the header-bar 55 at the end of the same. As a result of these connecting means, when the header-bar is advanced to cause the header to act on the spoke it will pull the lower end of the pendent lever forward, which action will through the medium of link 66 advance the cap-plate D and the rim-supports carried thereby, but owing to the fact that the connection of the cap-plate with the pendent lever is nearer its pivotal point the cap-plate will move at less speed than the header, the result being that while the header is making its full stroke the rim-support will be moved but one-half the distance. This reduced motion of the rim-support is positively transmitted to the hub-holder frame 12 (in order that the hub, which has already been connected with the inner end of the spoke, may go back with the spoke) by means of two connecting-rods 72 and 73, Figs. 1, 2, and 9, jointed at their ends, respectively, to the sides of the frame 12 and to the sides of the cap-plate.

In order that the relative movements of the rim-support and rim-header may be varied, I so connect the end of the link 66 with the pendent lever that its point of attachment may be adjusted to and from the pivot 68ª of the lever. This attachment is shown in Figs. 1, 8, and 8ª, where it will be seen that the lever 68 is provided in opposite sides with vertical guiding-grooves, in which extend ribs 68× on two cheek-plates 68ᵇ, applied to the opposite sides of the lever and connected therewith by through-bolts 68ᶜ, by which the plates may be adjusted along the lever and held in the desired position. These cheek-plates are each provided with a forwardly-extending ear, between which the end of the link is pivoted by pivot-pin 67ª.

The spoke-clamps 8 and 9, before alluded to, are identical in form and construction, except as to the character of the grasping-surfaces. Those of clamp 9 serve merely to grasp the spoke adjacent the shoulder at the outside of the hub, while those of the other clamp act when the spoke is moved endwise through it to form the scraped-up shoulder. The clamping device 8 comprises, as shown more particularly in Figs. 1 and 3, two vertical jaws $8^a$ and $8^b$, mounted between their ends on horizontal sleeves $8^c$, which sleeves are mounted loosely to rock on the two frame-bars and within bearings in the upper ends of two standards 74 and $74^\times$, extending upward from the bed-plate. The ends of the jaws above the sleeves are provided in their inner faces with grasping-dies, each containing a horizontal semicircular groove $8^d$ to conjointly embrace the spoke, which grooves are enlarged at the end adjacent the rim of the wheel to form a socket $8^f$, and this socket when the spoke is moved endwise receives and gives form to the scraped-up material and accumulates it against the inner face of the rim in the form of a shoulder. The jaws of the clamp are operated to close on the spoke by means of a horizontal longitudinally-extending rocking member 76, mounted in bearings in the two standards 74 and $74^\times$, respectively. This rocking member is formed at diametrically opposite points with two cam-surfaces $76^a$ and $76^b$, adapted when the member is rocked in the direction of the arrow in Fig. 3 to engage friction-rollers $8^h$ and $8^g$, mounted, respectively, on the lower ends of the vertical jaws, which cam-surfaces are of such form that when they engage the rollers they will act to separate the lower ends of the jaws, and thus close their upper ends on the spoke. On the movement of the cams of the rocking member in the opposite direction the jaws are automatically opened by means of a horizontal spring $8^i$, connected to them below their axes and tending to draw them together at this point. The rocking of the cam member to close the jaws is effected by the rise of a piston 78 in a cylinder 79, resting on the base-plate, when pressure is admitted beneath the piston. The piston is provided with a jointed piston-rod 80, pivoted at the upper end between ears $76^e$, projecting from the side of the rocking member, by which means this member will be rocked, as indicated by the arrow, when the piston rises. When the cylinder is opened to exhaust, the cam member will be returned to its former position and the piston lowered by means of a spring 81, Fig. 1, connected with the end of the cam member at its side and with the bed-plate of the machine. The other spoke-clamp 9 comprises two vertical jaws $9^a$ and $9^b$, mounted on the sleeves $8^c$ and formed in their upper ends with grooved spoke-clamping dies $9^c$, which grasp the spoke just back of the shoulder at the outer side of the hub, so as to prevent the spoke from moving endwise while the hub-header is acting on the end of the spoke within the hub. The jaws of this clamp are operated simultaneously with the operation of the other clamp and by the rocking cam member 76, which latter is extended between the lower ends of the jaws $9^a$ and $9^b$, and engage friction-rollers thereon.

Figures 3, 3A, 4, 5:
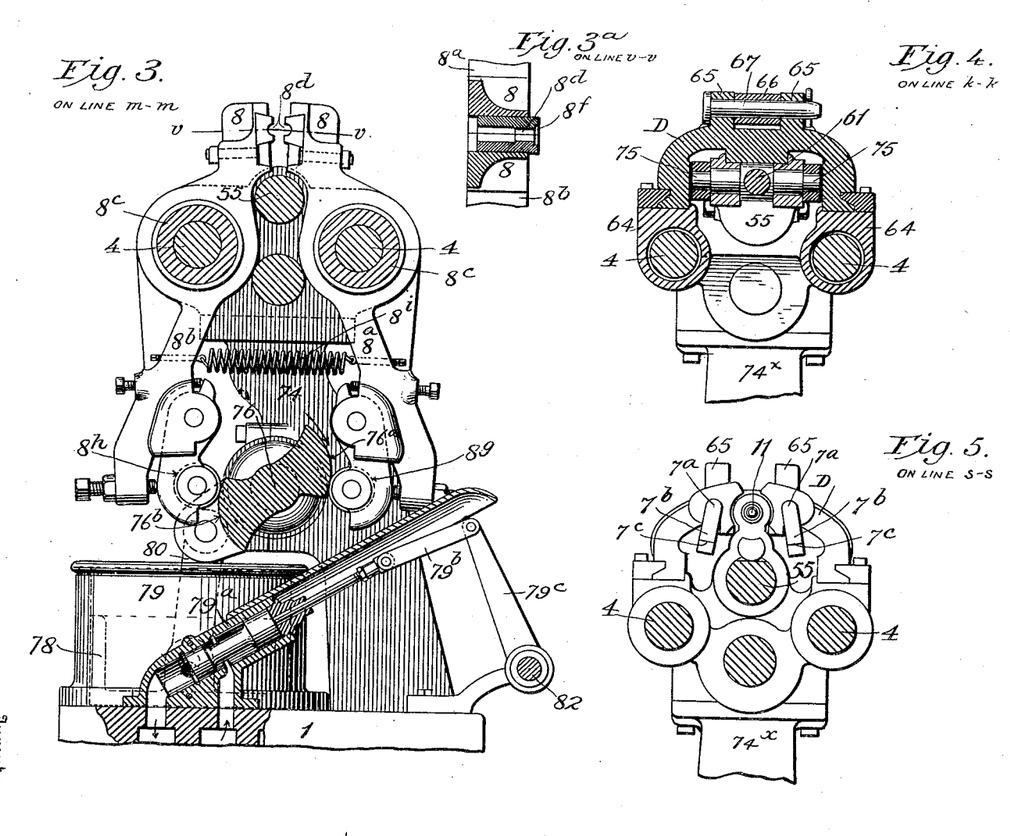
Figure 6:
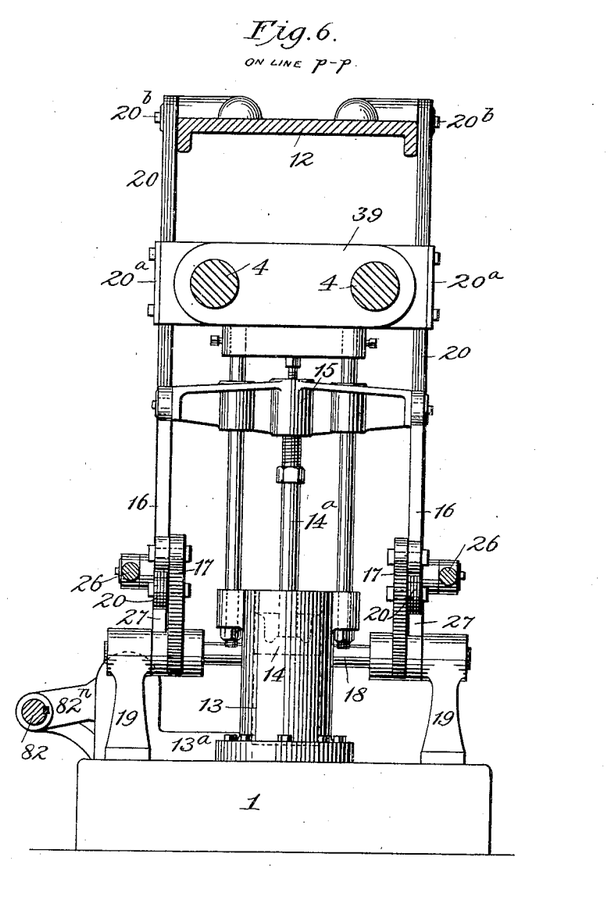
Fig. 6 is a similar view on the line *p p* of Fig. 1 looking in the direction of the arrows on said line.
Figure 10:
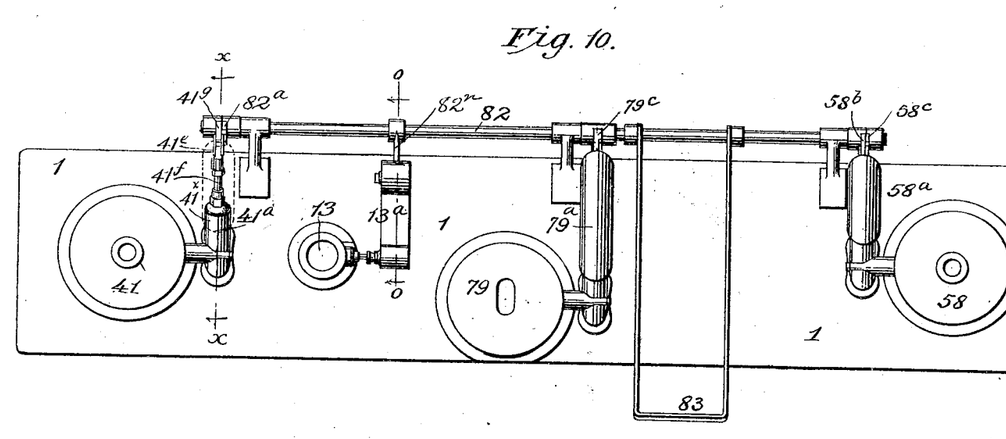
Fig. 10 is a plan view of the base-plate, the several operating-cylinders for the various operating mechanisms, and their controlling-valves.
Figures 10A, 11:
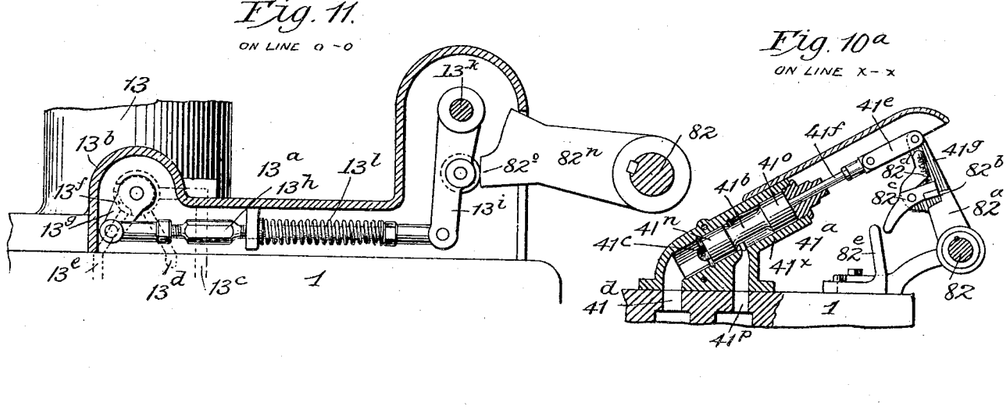

The control of fluid under pressure to and its exhaust from the several actuating-cylinders is effected by controlling-valves, one for each cylinder, which valves are operated by a longitudinally-extending rock-shaft 82, mounted on the base-plate at the rear side of the machine, as shown in Fig. 10, which shaft is depressed by a foot-lever 83, extending at the front of the machine and elevated when released by a returning-spring 84, connected with the lever and with the frame of the machine at a point above the same. The controlling-valve for cylinder 13 is indicated at $13^a$, the valve for cylinder 79 at $79^a$, the valve for cylinder 41 at $41^a$, and the valve for cylinder 58 at $58^a$. All of these valves, with the exception of that for controlling the operation of the hub-holding frame, are of the "piston" type, as shown in Figs. 3 and $10^a$, and they are identical in form and operation except that the valve $41^a$ is adapted to be automatically tripped on the down motion of the foot-lever to effect the exhaust of cylinder 41, so that the hub-header may be retracted immediately after it has acted to upset the end of the spoke in the hub. For this purpose valve $41^a$ is provided with a tripping mechanism, as shown in Fig. $10^a$. The other valves $79^a$ and $58^a$ are operated to exhaust their respective cylinders by the upward movement of the foot-lever. Referring to Fig. $10^a$, it will be seen that the valve is in the form of two connected pistons $41^n$ and $41^o$, the latter being of greater diameter than the former and connected together by a reduced neck $41^b$. These connected pistons are mounted to reciprocate in a cylindrical valve-casing $41^\times$, connected with the source of pressure by port $41^p$, with the cylinder by port $41^c$, and with the exhaust by port $41^d$, the relation and extent of movement of the parts being such that the larger piston will be at all times subject to the pressure, which pressure will tend to move the piston to the position shown, in which position of the parts pressure to the cylinder is cut off by the small piston and the cylinder opened to the exhaust. When the pistons move forward from this position, they first close the exhaust-port and then establish communication of the pressure with the interior of the cylinder through the annular space surrounding the neck. In the operation of this valve by the shaft 82 when the foot-lever is depressed the two connected pistons will be moved forward against the pressure acting on the larger one and will admit pressure to the actuating-cylinder, which communication will continue until a predetermined point in the movement of the parts is reached, whereupon the valve-piston will be automatically released and the pressure acting on the larger of the two pistons will immediately return the parts to their former positions, thereby cutting off pressure to the actuating-cylinder and opening the latter to the exhaust. This automatic release of the valve-pistons is effected by the mechanism shown in Fig. 10$^a$, where it will be seen that the stem 41$^f$ of the piston-valves is connected, by means of a link 41$^e$, with the outer end of an arm 41$^g$, having its inner end mounted loosely on the rock-shaft 82. Adjacent to this arm there is fastened to the rock-shaft a shorter arm 82$^a$, provided with a shoulder 82$^b$, which is adapted to engage the rear end of a dog 82$^c$, pivoted between its ends on arm 41$^g$ and acted on by a spring 82$^d$, which spring tends to hold the dog in position to be engaged by the shoulder, in which position of the parts the motion of the fixed arm 82$^a$ will be imparted to the movable arm and by it to the valve-piston. After the parts thus locked have moved a predetermined distance the dog is tripped by the engagement of its end with a vertical finger 82$^e$, fixed to the base-plate of the machine, the engagement with this finger acting to rock the dog on its axis, and thereby disengage its end from the vertical shoulder on the fixed arm, and the parts being thus released the pressure on the larger piston will quickly retract the connected pistons and will cut off pressure to the cylinder and open the same to the exhaust, the fixed arm 82$^a$ in the meantime continuing its movement as the foot-lever is further depressed.

The valve 79$^a$ embodies, as in that just described, two connected pistons of different diameters, and they are connected, by means of a link 79$^b$, with an arm 79$^c$ on the rock-shaft. In like manner valve 58$^a$ comprises two connected pistons of different diameters connected, by means of a link 58$^b$, with an arm 58$^c$ on the rock-shaft. The pistons of these valves and the ports controlled by them are of such form and relation that on the downstroke of the foot-lever they will act to admit pressure to their respective cylinders at the proper time to cause them to act in the proper sequence, and on the return of the lever they will act to cut off this pressure and open the cylinders to the exhaust in like sequence. These several piston-valves act, therefore, in the following order: On the depression of the foot-lever and after the parts of the wheel have been first lowered into active relation to the operating mechanism by the operation of valve 13$^a$ pressure is admitted to cylinder 79 to close the clamps, then to cylinder 41 to operate the hub-header, from which it is next automatically cut off and the cylinder exhausted to retract the hub-header, then to cylinder 58 to operate the rim-header. On the rise of the foot-lever pressure is first cut off from the cylinder 58 and this cylinder opened to the exhaust, and then cylinder 79 will be exhausted to open the clamps. The first action of the foot-lever on its depression lowers the hub-supporting frame by actuating the three-way valve 13$^a$, Fig. 11. This valve is cylindrical in cross-section and mounted in a casing 13$^b$, containing a passage 13$^c$, connected with the source of pressure, a passage 13$^d$, leading to the cylinder, and an exhaust-passage 13$^e$. The valve is formed with a port 13$^f$, which when turned in the position shown will admit pressure to the cylinder and cause the piston of the actuating-cylinder to rise, and when the valve is turned in its other position it will cut off the pressure to the actuating-cylinder and open the same to the exhaust. The valve is provided with an arm 13$^g$, connected by link 13$^h$ with a lever 13$^i$, pivoted at its upper end, as at 13$^k$, to the frame of the machine, which lever is provided with a friction-roller engaged by an arm 82$^n$, fixed on the rock-shaft 82. This arm has an elevated surface 82$^o$, which when in engagement with the roller holds the parts of the valve in such position that the pressure is admitted to the cylinder 13 and its piston held elevated. This is the position of the parts when the foot-lever is in its raised position and before being actuated. On the depression of the foot-lever the arm 82$^n$ is moved downward and the elevated surface 82$^o$ is carried free of the roller, which will permit a spring 13$^l$ on the link 13$^h$ to move the latter to the right and turn the valve so as to cut off the pressure to the cylinder and open it to the exhaust, thus permitting its piston to descend.

The operation of the machine is as follows: The parts being in the position shown in Fig. 1, with valve 13$^a$ adjusted to admit pressure to cylinder 13 and the other valves adjusted to open their respective cylinders to the exhaust, the hub-holding frame will be elevated and be sustained at an inclination downward, the clamps will be opened, the hub-header retracted, and the rim-header and rim-support also retracted. A hub, a closed rim, and a shouldered spoke with its rim end thickened being provided and the ends of the spoke heated, the hub is first set on end in the hub-socket and the conical head adjusted in its upper end. The rim is then placed on the roller-supports and the clamping-arm 51 adjusted so as to bear at the inner face of the rim, and finally the heated spoke has its outer end passed through a hole in the rim and then moved backward and its inner end passed through one of the holes of the lower rank in the hub and the previously-formed shoulder on the spoke set against the outer face of the hub. Foot-lever 83 is now depressed, the first part of the stroke releasing the valve 13ª, and this being thrown by its actuating-spring to a position to exhaust the cylinder the piston of the cylinder will descend by weight of the frame, and the parts of the wheel supported thereby will be lowered into active relation to the operating mechanisms, the descent of this frame causing the clamping-head to firmly press on the upper end of the hub, and when the parts are finally at rest the spoke will extend horizontally within the clamps, the lower edge of the rim will rest upon the supporting-fingers 7ª, the inner end of the spoke will be opposite the hub-header, its outer end will be opposite the rim-header, and the hub will stand at an inclination to the spoke, which is its relation in a staggered wheel. A further downward movement of the foot-lever advances the piston-valve 79ª, so as to cut off the exhaust and admit pressure to the actuating-cylinder 79, thereby causing its piston to rise and to rock the cam member and close the clamps on the spokes. On the continued depression of the foot-lever valve 41ª will be moved to position to admit pressure to its cylinder, and the piston rising the hub-header will be advanced and will upset the end of the spoke within the hub, which action will be immediately followed by the automatic tripping of valve 41ª and the exhaust of its cylinder, whereby the header will be positively retracted. The spoke is now secured to the hub. The further downward movement of the foot-lever will move valve 58ª to position to admit pressure to cylinder 58, which action will result in the simultaneous advance of the rim-header and rim-support and also the bodily movement of the hub and connected spoke to the left, Fig. 1, and these movements will result in the heading of the outer end of the spoke and the formation of the scraped-up shoulder at the inner face of the rim. The foot-lever has now completed its downstroke, and the spoke has been secured to the hub and rim. On the upward stroke of the foot-lever the first action results in the cutting off of pressure to cylinder 58 and its opening to the exhaust, which will in turn result in the retraction of the rim-header and rim-support and the shifting of the parts of the wheel horizontally again to their former position. The second part of the upstroke of the foot-lever will draw valve 79ª to position to cut off pressure to cylinder 79 and open the same to the exhaust, resulting in the opening of the spoke-clamps, while the final part of the upstroke of the foot-lever will turn valve 13ª so as to admit pressure to cylinder 13, and thereby cause the hub-holding frame and the connected parts of the wheel sustained thereby to be elevated and released. The hub and rim connected by the spoke just fastened is now shifted around on the roller-supports to bring the next hole in the hub in the lower rank in position for another spoke, which is set in place with its outer end extending through the next alternate hole in the rim and its inner end through the next hole in the lower rank in the hub. The foot-lever is now again depressed, resulting in the operations described and the attachment of the second spoke, and these operations are repeated until all of the spokes of one rank have been secured in succession entirely around the wheel. The partly-completed wheel is now removed from the machine, and it is turned side for side and again set in place in the machine in reverse position, time being given to permit the spokes to cool sufficiently to place them under tension. This cooling and contraction of the spokes will act to draw the hub in the direction of its longitudinal axis, and with references to the rim, a distance which in practice has been found to be twice that which the hub will be drawn back when the second rank of spokes have been secured and have cooled. The machine is now operated to secure the second rank of spokes in place in a manner similar to the first, the outer ends of the spokes being fastened, respectively, in the holes left between those first secured. After this operation the wheel is completed, and on being released and allowed to cool the contraction of the rank last secured will act to draw the hub back, thereby bringing the parts of the wheel to their proper relative positions and placing all of the spokes under a uniform and strong tension.

It will be observed that when the partly-completed wheel is removed from the machine after the first rank of spokes have been secured the hub is free to move relatively to the rim when the spokes contract, and in this way the hub will give to the strain exerted by these contracting spokes, the result being that the tension of the spokes is slight. When the other rank has been secured, their contraction, due to cooling, will meet with greater resistance, and a free movement of the hub will not be permitted; but the movement will be sufficient only to distribute the strain last exerted evenly among all of the spokes. In other words, the strain exerted by the rank last secured will act until balanced by the tension which they place on the rank first secured.

In order that the machine may be adapted for making straight wheels in which the spokes are secured in a single line around the hub at a point opposite the center of the rim and in which the axis of the hub will stand at right angles to the general plane of the wheel, I provide for so adjusting the hub-holding frame 12 that it will support the parts of the wheel in these relations and present them so to the action of the operative parts of the machine. The means for effecting this adjustment are shown in Fig. 1, where it will be seen that the vertical bars 21, which move and sustain the outer end of the hub-frame, are provided with the turnbuckles 22, before alluded to. The opposite end of the frame is adapted to be adjusted by shifting the head 15 along the piston-rod, which latter is screw-threaded and screwed into the head. By this means the hub-holding frame may be set at a truly horizontal position or otherwise adjusted to meet the conditions encountered.

Having thus described my invention, what I claim is—

1. In a machine for making metal wheels the combination with the spoke-fastening means, of a hub-support adapted to sustain the hub on end, and cranked arms projecting laterally from said hub-support and adjustable around their longitudinal axes and adapted to sustain the rim; whereby the rim-support is adjustable vertically with reference to the hub-support.

2. In a machine for making metal wheels and in combination with spoke-fastening means, a flat frame, means for moving said frame bodily relatively to the spoke-fastening means and in the direction of the axis of the hub, an extension on the end of said frame adjustable in the direction of the axis of the spoke and adapted to give support to the hub, and arms extending laterally from said extension and adapted to support the rim.

3. In a machine for making metal wheels, the combination of a support for the hub and rim, movable bodily in the direction of the longitudinal axis of the spoke, mechanism for fastening the inner end of the spoke to the hub, mechanism for fastening the outer end of the spoke to the rim, said latter mechanism comprising a spoke-clamp and a header movable relatively to the clamp toward the hub, and operative connections between said header and the hub and rim-support; whereby when the header advances to perform its functions it will move the hub and rim-support in the direction of the longitudinal axis of the spoke.

4. In a machine for making metal wheels, the combination of a support for the rim adapted to allow the rim to move in the direction of the axis of the spoke, means for sustaining the spoke in operative relation to the rim, mechanism for fastening the spoke to the rim, a rest adapted to bear against the outer face of the rim and movable in the direction of the longitudinal axis of the spoke, and connections between the rest and spoke-fastening means, constructed to advance the rest and rim, and maintain the rest in contact with the advancing rim while the spoke is being fastened to the rim.

5. In a machine for making metal wheels, the combination with a support for the rim adapted to allow the rim to move in the direction of the longitudinal axis of the spoke, of means for fixedly sustaining the spoke in relation to the rim to be fastened thereto, a heading device for the outer end of the spoke adapted when advanced to form a head thereon, a rest in position to bear against the outer face of the rim while the head is being formed and movable in the direction of the axis of the spoke, and means controlled by the advance of the heading device for moving said rest relatively to the header and in the direction of the axis of the spoke.

6. In a machine for making metal wheels, the combination with means for sustaining the rim in such manner that it may move bodily in the direction of the axis of the spoke, of means for sustaining the spoke in operative relation thereto, a heading device adapted when advanced to form a head on the outer end of the spoke, means for advancing said heading device, a rest in position to bear on the outer side of the rim adjacent the heading device, and means for moving said rest simultaneously with the heading device, in the direction of the same, but at less speed.

7. In a machine for making metal wheels, the combination of a support for the rim and hub adapted to allow the rim to move in the direction of the axis of the spoke, means for fixedly sustaining the spoke in operative relation to the hub and rim, means for fastening the spoke to the hub, a header adapted when advanced to form a head on the outer end of the spoke, a rest in position to bear against the outer face of the rim while the head is being formed, and means controlled by the movement of the header for moving the rest in the direction of the spoke-axis and relatively to the header in the direction of its heading movement.

8. In a machine for making metal wheels, the combination of a support for the rim and hub movable in the direction of the axis of the spoke, means for sustaining the spoke in operative relation to the hub and rim, means for fastening the spoke to the hub, a header adapted when advanced to form a head on the outer end of the spoke, a rest in position to bear against the outer face of the rim, means controlled by the movement of the header for moving the rest in the direction of the spoke-axis, and operative connections between said rest and the supporting device, adapted to move the support in the same direction as that imparted to the rest.

9. In a machine for making metal wheels, the combination of a hub-support adapted to sustain the hub on end and movable transversely of its longitudinal axis, means for supporting the rim in operative relation thereto, means for sustaining the spoke in operative relation to said hub and rim, means for fastening the inner end of the spoke to the hub, a header adapted by its advance to head the outer end of the spoke, a rest in position to bear against the outer face of the rim, and movable in the direction of the axis of the spoke, means for moving said rest, and operative connections between the rest and the hub-support, adapted to move the support in the same direction as that imparted to the rest.

10. In a machine for making metal wheels, the combination with a spoke-clamp adapted to grasp the spoke adjacent the inner face of the rim and formed to permit the spoke to be moved endwise relatively, a supporting device for the hub and rim adapted to hold said parts in operative relation to the spoke and movable in the direction of the axis of the spoke, means for fastening the inner end of the spoke to the hub, a heading device adapted when advanced to upset the outer end of the spoke, a rest in position to bear against the outer face of the rim, means for moving said rest simultaneously with, in the same direction of, but at less speed than the heading device, and means for moving the supporting device simultaneously with and at the same speed of the rest.

11. In a machine for making metal wheels, the combination of a support for the rim, means for sustaining the spoke, a clamp adapted to grasp the spoke near the inner face of the rim, means for moving the spoke and rim relatively to said clamp in the direction of the axis of the spoke, and an abutment independent of the clamp and adapted to bear firmly against the inner face of the rim as the latter approaches the clamp.

12. In a machine for making metal wheels, the combination of means for supporting the rim so that it may be moved in the direction of the axis of the spoke, means for sustaining the spoke in operative relation to the same, a heading device adapted by its advance to upset the outer end of the spoke, a rest in position to bear against the outer face of the rim and movable in the direction of the axis of the spoke, and an abutment in position to bear against the inner face of the rim and movable with the rest.

13. In a machine for making metal wheels, the combination with a support for the hub adapted to sustain the same on end, a relatively fixed arm above the support, hub-clamping mechanism sustained by the arm, means for supporting the rim on edge around the hub, an arm mounted on the first-named arm and formed with an abutment to bear against the inner face of the rim, means for sustaining the spoke in operative relation to the rim and hub, and means for fastening the spoke to the rim and hub.

14. In a machine for making metal wheels, the combination of means for supporting the rim and spoke in operative relations to be fastened together, mechanism for fastening the spoke to the rim, a sustaining device on which the lower edge of the rim is adapted to rest, and a finger adapted to bear on the upper edge of the rim.

15. In a machine for making metal wheels, the combination with a support for the rim, of means for sustaining the spoke in operative relation to the same, a rest in position to bear against the outer face of the rim, an abutment adapted to bear against the inner face of the rim, a sustaining device on which the lower edge of the rim is adapted to rest, and a finger adapted to bear on the upper edge of the rim.

16. In a machine for making metal wheels, the combination of a rim-support, means for sustaining the spoke in operative relation to the rim, a rest adapted to bear against the outer face of the rim, and a sustaining device on which the lower edge of the rim is adapted to rest, said sustaining device being carried by the rest.

17. In a machine for making metal wheels, the combination of a hub-support movable in the direction of the axis of the spoke, means for sustaining the rim around the hub, means for holding the spoke in operative relation to said parts, a movable header for the outer end of the spoke, a sliding cap-plate operatively connected with the header, a rim-rest on the cap-plate, and links connecting said cap-plate operatively with the hub-support.

18. In a machine for making metal wheels, the combination with a horizontal vertically-movable hub-holding frame, of a rim-support carried by said frame, an actuating device for moving the frame vertically, vertical bars connected to the frame at one end of the same, vertical links connected with the frame at its other end, and operative connections between the bars and links and the actuating device.

19. In a machine for making metal wheels, the combination with the frame having a vertical standard formed with a vertical open guideway, of a hub-holding frame adapted to be moved in a direction longitudinally of the spoke, and formed with a guide-lug sliding in the guideway, means for moving said frame vertically, means for sustaining the hub and rim in operative relations to the spoke and means for fastening the spoke to the hub and rim.

20. In a machine for making metal wheels, the combination with a horizontal vertically-movable hub-holding frame, of a rim-support carried thereby, an actuating device for moving the frame vertically, and means for adjusting the ends of said frame independently and with relation to the actuating mechanism.

21. In a machine for making metal wheels, the combination of two spoke-clamps adapted to act respectively at opposite ends of the spoke, and each comprising opposing jaws pivoted between their ends on parallel axes and provided on one side of said axes with spoke-grasping surfaces, a longitudinally-extending rocking member formed on opposite sides with cam-surfaces adapted to engage the inner sides of the jaws of both clamps, and adapted to close the jaws on the spoke, an actuating cylinder and piston, and operative connections between the piston and said rocking member; whereby the rocking member serves to operate both clamps in unison.

22. In a machine for making metal wheels, the combination with means for supporting the hub and rim in operative relations, said supporting means being movable in the direction of the axis of the spoke to be secured, of a spoke-clamp adapted to grasp the spoke adjacent the hub and acting to permit a movement of the spoke endwise toward the hub only, a second spoke-clamp adapted to grasp the spoke adjacent the rim and acting to permit the spoke to be moved endwise, a heading device for the hub end of the spoke adapted to upset the spoke within the hub and against the holding action of the first-named clamp, a heading device for the opposite end of the spoke adapted when advanced toward the hub to upset the end of the spoke outside the rim, means controlled by the advance of this header for moving the rim and connected spoke and hub in the direction of the axis of the spoke and with relation to the clamp, and means for forming a shoulder on the spoke at the inner face of the rim when the spoke is moved endwise.

23. In a machine for making metal wheels, the combination of a support for the hub and rim movable vertically and horizontally, a cylinder 13, a piston therein operatively connected with said support, spoke-clamps, a cylinder 79, a piston therein operatively connected with said clamps, a hub-header, a cylinder 41, a piston therein operatively connected with the hub-header, a rim-header, a cylinder 58, a piston therein operatively connected with the rim-header, valves for the respective cylinders controlling the admission to and exit of fluid under pressure from the same, a common operating means for said controlling-valves, and connections between said operating means and the respective valves, said valves and connections being so formed and related that when the common operating means is actuated, cylinder 13 will be first opened to the exhaust, then pressure admitted to cylinder 79, then this cylinder opened to the exhaust, then pressure admitted to cylinder 58 and this cylinder opened to the exhaust, then cylinder 79 opened to the exhaust, and finally pressure admitted to cylinder 13.

In testimony whereof I hereunto set my hand, this 11th day of October, 1904, in the presence of two attesting witnesses.

EMIL EINFELDT.

Witnesses:
M. LOUISE DODGE,
ANDREW NEILSON.